United States Patent [19]

Kamo

[11] Patent Number: 4,807,074
[45] Date of Patent: Feb. 21, 1989

[54] MAGNETORESISTIVE HEAD FOR MAGNETIC DISK

[75] Inventor: Yoshihisa Kamo, Kokubunji, Japan

[73] Assignee: Hitachi, Ltd., Tokyo, Japan

[21] Appl. No.: 127,162

[22] Filed: Dec. 1, 1987

[30] Foreign Application Priority Data

Dec. 1, 1986 [JP] Japan .................... 61-284328

[51] Int. Cl.$^4$ ................................ G11B 5/30
[52] U.S. Cl. ........................ 360/113; 360/126
[58] Field of Search .................. 360/104, 113, 126

[56] References Cited

FOREIGN PATENT DOCUMENTS 59-121617 7/1984 Japan .
59-35088 8/1984 Japan .

OTHER PUBLICATIONS

"Engineering Design of a Disk Storage Facility with Data Modules", IBM Journal of Research & Development, Nov. 9, 1974, pp. 489–505.

Primary Examiner—A. J. Heinz
Attorney, Agent, or Firm—Fay, Sharpe, Beall, Fagan, Minnich & McKee

[57] ABSTRACT

In a plurality of magnetoresistive heads for reading information from regions obtained by dividing a disk-shaped recording medium into concentric circles, the thickness of a magnetoresistive film included in a magnetoresistive head assigned to an outer region is made larger than the thickness of a magnetoresistive film included in a magnetoresistive head assigned to an inner region.

7 Claims, 4 Drawing Sheets

REVOLUTION DIRECTION $T_{MR1} < T_{MR2}$

MAGNETORESISTIVE HEAD FOR MAGNETIC DISK

BACKGROUND OF THE INVENTION

The present invention relates to a magnetic disk unit and a floppy disk drive, and in particular to a magnetic head suitable to an apparatus for reading/writing information from/onto an information storage surface by using a plurality of magnetic heads.

A Magnetic head using a magnetoresistive film (hereafter abbreviated as MR head) has gradually come into use as a read head of magnetic memory units. The MR head uses a resistance change caused by magnetization of an extremely thin magnetoresistive film (MR film) such as a Permalloy* film. (* Permalloy is a trademark.) As the MR film, an extremely thin soft magnetic film usually having thickness of 1,000 Å or less is used to raise its sensitivity. If the MR film is placed in a strong magnetic field, therefore, the MR film is completely magnetized and the resistance value of the MR film becomes constant. That is to say, so-called saturation is caused. Under such a state, its resistance value is not changed by an external magnetic field. If such an MR film is used in magnetic memory, its resistance value becomes constant irrespective of signal magnetic field generated by a recording medium. As a result, faithful signal reproduction cannot be performed.

On the other hand, there are magnetic disk units and floppy disk drives having disk-shaped recording media among magnetic memory units. In these memory units, information is recorded by using an identical recording clock as reference in both inner recording tracks and outer recording tracks of the disk. Accordingly, the recording density of outer recording tracks is lower than that of inner recording tracks. As a result, strong magnetization remains on outer recording tracks.

As MR heads used in such drives, an MR head integrated with a write head as described in JP-B-No. 59-35088 (published on Aug. 27, 1984, and corresponding to U.S. Ser. No. 498,504 filed on Aug. 19, 1974), and an MR head described in JP-A-No.59-121617 (laid open on July 13, 1984, and corresponding to U.S. Ser. No. 450,622 filed on Dec. 17, 1982) have been proposed, for example. In these known examples, however, the above described saturation of the MR film caused by a stronger signal magnetic field at outer tracks on the recording disk has not been considered at all.

SUMMARY OF THE INVENTION

An object of the present invention is to provide an MR head suitable to a magnetic head used in an apparatus having a plurality of read-write heads per disk surface and having data regions obtained by dividing the disk surface into concentric circles.

For MR films used in a plurality of magnetic heads (two magnetic heads in case of FIG. 2) to read/write information from/onto an identical surface of a disk, the above described object is achieved by making an MR film of a magnetic head located at outer side thicker than an MR film of a magnetic head located at inner side as shown in FIG. 2.

When an MR element is disposed as shown in FIG. 3, the resistivity of the MR element can be expressed as $$\rho = \rho_o + \Delta\rho\{1 - (B_y/B_s)^2\} \quad (1)$$

where
- $\rho_o$; intrinsic resistivity
- $\Delta\rho$; magnetic resistivity
- $B_s$; saturation magnetic flux density (the easy axis run in the x direction)
- $B_y$; y-direction component of magnetic flux density of the MR film caused by an external magnetic field which can be represented as $B_y = \mu(H_{Ex} - H_d)$, where $H_d$ = demagnetized field and $\mu$ = permeability.

Accordingly, the resistance change with respect to the external magnetic field can be represented by a square curve which is convex upward as shown in FIG. 4. In a portion of the curve where the external magnetic field has a large value, the demagnetized field within the MR film operates to make the resistance change small.

In order to keep the resistance change of the MR element linear with respect to the external magnetic field, a constant DC magnetic field is usually applied to the MR element beforehand. This is called bias magnetic field $H_b$. Its optimum magnitude is equal to approximately half of the range of the external magnetic field in which the resistance changes.

When an MR element is used as a read magnetic head, it is necessary that the operation range exists within the linear region of the resistance change. As described above, strong recording magnetization remains on outer tracks of a disk (as well as a floppy). When strong magnetization is read, it is possible to prevent the saturation of the MR element by making the M film thick and hence making $B_y$ of the expression (1) small by that amount. For the purpose of making the resistance change large (i.e., raising the sensitivity), however, the resistance of the MR film itself must be raised. For this purpose, it is desirable to make the MR film thin.

DESCRIPTION OF THE PREFERRED EMBODIMENTS

Figure 2:
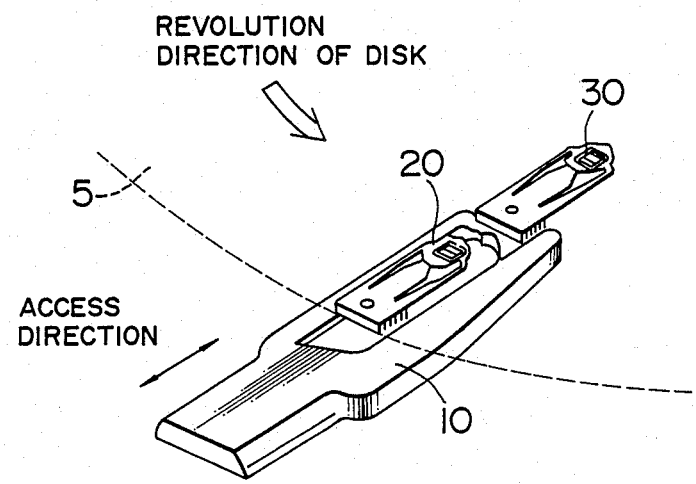
FIG. 2 is an oblique view of showing an embodiment of a whole head according to the present invention.
Figure 3:
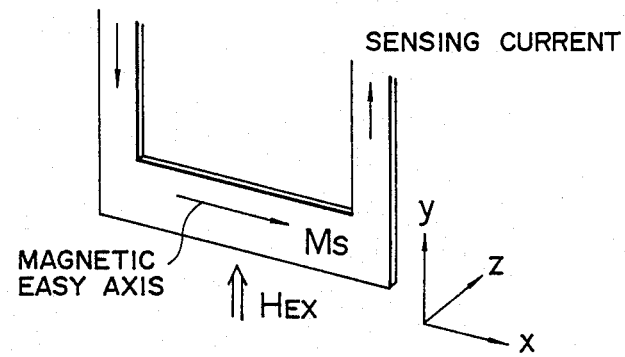
FIG. 3 shows the operation of an MR head.
Figure 4:
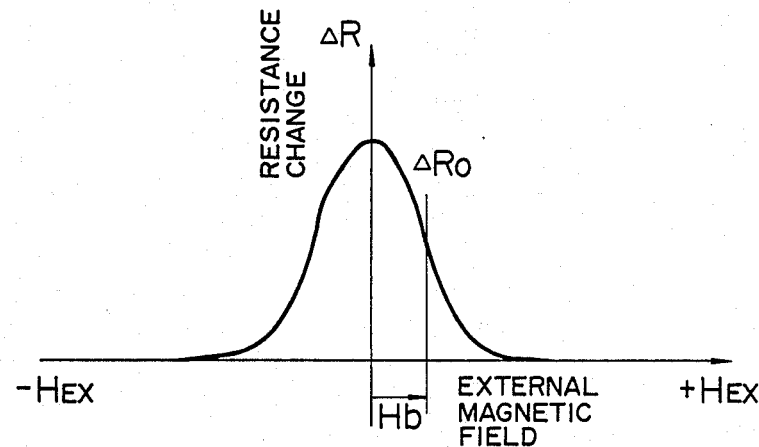
FIG. 4 shows the resistance change of an MR element.

An embodiment of a magnetic head for a magnetic disk unit having a disk of a diameter of 14 inch (revolution speed: 3600 r.p.m.) according to the present invention will now be described by referring to FIG. 2. In this embodiment shown in FIG. 2, one surface of a disk 5 as described in IBM Journal of Research and Development, November 1974, pp. 489–505, particularly p. 495 is divided into inner tracks and outer tracks to undergo read and write operation performed by two read-write heads 20 and 30 mounted on one head arm 10. Half of the tracks located at the outer side (not illustrated) undergo the read and write operation performend by the head 20, and half of the tracks located at the inner side undergo the read and write operation performed by the head 30.

Figure 1A:
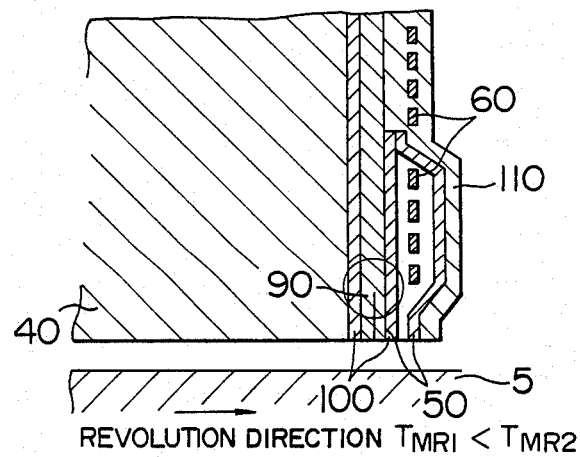
FIGS. 1a and 1b are sectional views showing an embodiment of a head according to the present invention.
Figure 1B:
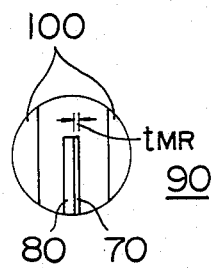

Each of the heads 20 and 30 has a basic structure as shown in FIGS. 1a and 1b. As described in JP-B-No. 59-35088, each of the heads 20 and 30 has a write head and a read head disposed at one end of a slider 40. The write head has a magnetic circuit 50 and coils 60 as shown in FIG. 1a. An enlarged view of a part of the read head is shown in FIG. 1b. In the read head, an MR element 90 including an MR film 70 having thickness of $t_{MR}$ and a bias film 80 is put between shields 100. The magnetic circuit 50 and the shield 100 have a part in common. The head of this structure is fabricated by using the same method as that described in JP-B-No. 59-35088. As the above described bias film 80, a titanium film having thickness of approximately 0.15 µm is deposited by using the conventional evaporation method to constitute a shunt biased MR element. The heads are protected by a protection film 110. As a result of application of the present invention, the thickness of the MR film 70 in the head 20 is made different from that in the head 30.

It is preferred that the ratio of the thickness $T_{MR1}$ of the MR film of the inner head to the thickness $T_{MR2}$ of the MR film of the outer head is essentially equal to the ratio between the values of magnetization strength remained on the disk. Assuming that the recording wavelength at the central track (i.e., a track having the strongest magnetization left and undergoing the read operation performed by the inner head), the disk film thickness at the central track, the recording wavelength at the outermost track and the disk film thickness at the outermost track are respectively $\lambda_1$‘, $T_1$, $\lambda_2$ and $T_2$, the above described ratio is attained by using the expression $$T_{MR1}/T_{MR2} = (\lambda_1 \times T_1)/(\lambda_2 \times T_2)$$

as a criterion.

Figure 6:
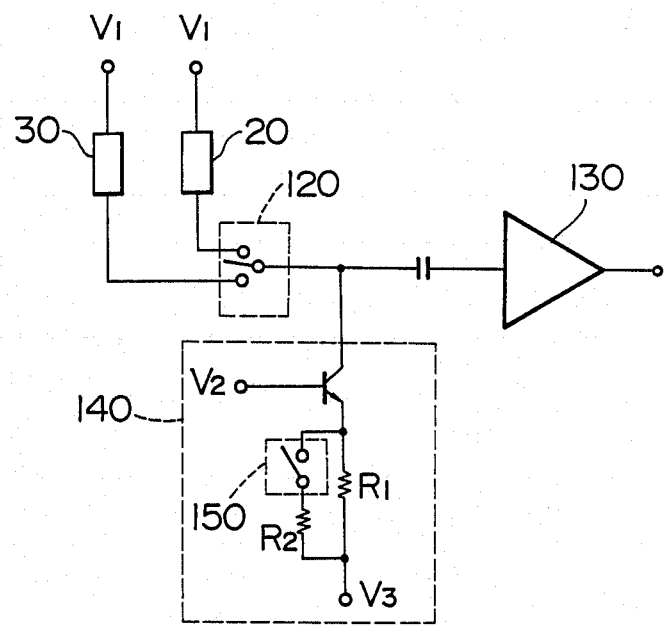
FIG. 6 shows a circuit for driving an MR head of the present invention.

Further, a circuit for driving the MR head used in this embodiment is shown in FIG. 6. In the drive circuit, the internal head 20 or the outer head 30 is so selected by an analog switch 120 as to be connected to the input of an amplifier 130. A circuit 140 is used to let flow a bias current through an MR head. (The bias current is common to a sense current in case of the shunt bias method.) When the outer head 20 has been selected, a switch 150 included in the circuit 140 is closed to increase the bias current so that an optimum bias magnetic field may be applied even if the MR film is thick. When the internal head 30 has been selected, the switch 150 is opened to supply a bias magnetic field suitable to a head having a thin MR film.

Figure 5:
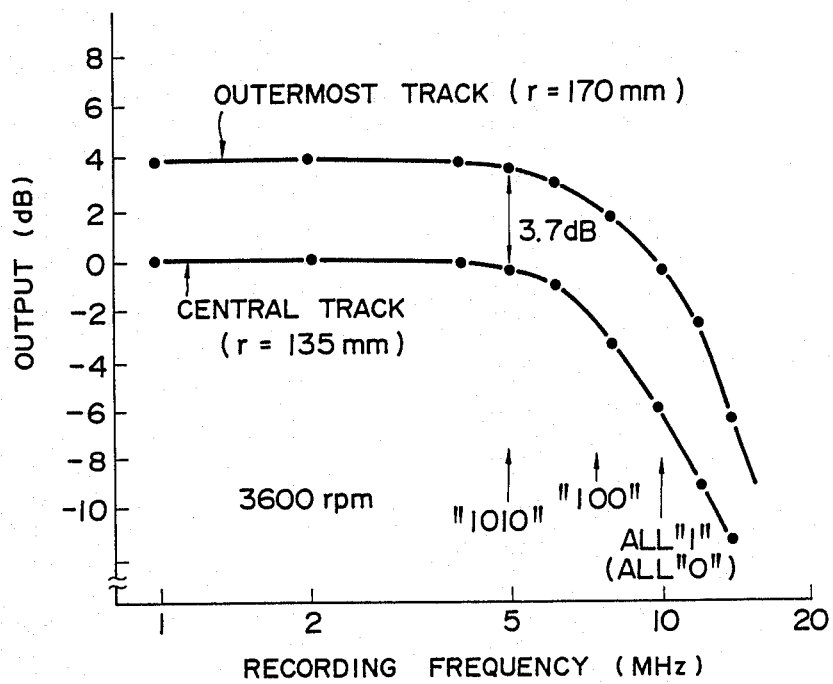
FIG. 5 shows the reproduction characteristics in a magnetic disk used for an embodiment of the present invention.

Frequency characteristics of the magnetic disk used in the present embodiment were measured by using a conventional inductive head. Results of the measurement are shown in FIG. 5. In FIG. 5, the difference in disk velocity of the output amplitude has already been compensated. The central track corresponds to the outermost track read by the inner magnetic head. If this magnetic disk is used with the MFM (Modified FM) modulation method, amplitude values at densities indicated by arrows of FIG. 5 are reproduced for respective data. For the data pattern "1010", the recording density becomes the lowest and hence the strongest magnetization remains. The ratio of the output of the central track to that of the outermost track can be regarded as the corresponding strength ratio of residual magnetization of the disk. Accordingly, the outer head undergoes a magnetic field which is 3.7 dB (1.5 times) stronger than that of the inner head. In the present embodiment, therefore, the thickness of the MR film of the outer head was made 1.5 times larger than that of the inner head. To be concrete, the thickness of the MR film of the inner head was defined to be 320 Å, and the thickness of the MR film of the outer head was defined to be 480 Å. The bias current was also changed between 14 mA to be let flow when the internal head was selected and 21 mA to be let flow when the outer head was selected. In this way, the sensitivity of the MR head was improved at the inner tracks, while the distortion of the reproduced waveform was prevented at the outer tracks.

In this embodiment, the MR head was driven by a constant current, and the bias current was changed over depending upon whether the head is inner one or outer one. However, it is evident that similar effects can be obtained even when the MR head is driven by constant voltage and the applied voltage to the outer head is made higher to let flow a larger bias current than that of the inner head.

Further, in case of a shunt biased MR head, it is evident that a suitable bias magnetic field can be applied even when the shunt film of the outer head is made thicker than that of the inner head to let flow a larger bias current. When another bias method such as a method of disposing a permanent magnet film near the MR film is employed, it is evident that it is sufficient to make the permanent magnet film of the outer head thick or make the residual magnetic flux density Br of the outer head larger than that of the inner head. When a bias method of disposing MR films asymmetrically in a gap formed by shield at both sides, i.e., of disposing MR films closer to shield located at either side is used as a further bias method, it is evident that a suitable bias magnetic field is obtained by disposing the MR film of the outer head closer to the shield film than the MR film of the inner head.

In the present embodiment heretofore described, one surface of a disk undergoes the read and write operation performed by two heads, i.e., the inner head and the outer head. Even when three or more heads are used, it is evidently sufficient to make the MR film of the inner head thin and make the MR film of the outer head thicker.

The present invention has heretofore been described by referring to a magnetic disk of 14 inch. However, a floppy disk drive using a similar read-write method can be considered in the same way. That is to say, it is evidently sufficient to make the film of an inner head thin and make the film of an outer head thick.

Further, the MR head in the present embodiment is biased by the shunt bias method. It is also evident that the effects of the present invention are obtained independently of the bias method used.

In accordance with the present invention, the MR film of an MR head is made thin for inner tracks where the recording density is high and weak signal magnetization remains on the magnetic disk, thus high sensitivity being maintained. Meanwhile, the MR film is made thick for outer tracks where relatively strong signal magnetization remains, thus linearity being assured.

What is claimed is:

1. A plurality of magnetoresistive heads for reading information from respective regions obtained by dividing a disk-shaped recording medium into concentric circles, wherein predetermined magnetoresistive heads are respectively assigned to said regions; and thickness of a magnetoresistive film included in a magnetoresistive head for reading information from one of said regions located at outer side of said disk-shaped recording medium is larger than thickness of a magnetoresistive film included in a magnetoresistive head for reading information from another one of said regions located at inner side of said disk-shaped recording medium.

2. A plurality of magnetoresistive heads according to claim 1, wherein said plurality of magnetoresistive heads are mounted on an identical head arm provided that said plurality of magnetoresistive heads are arranged on an identical face of said recording medium.

3. A plurality of magnetoresistive heads according to claim 1, wherein thickness $T_{MR1}$ and $T_{MR2}$ of magnetoresistive films of magnetoresistive heads respectively assigned to an inner region and an outer region, writing/reading wavelength $\lambda_1$ and $\lambda_2$ at outermost ends of the inner region and the outer region, and thickness $T_1$ and $T_2$ of said recording medium at the inner region and the outer region satisfy the relation $$T_{MR1}/T_{MR2}=(\lambda_1 \times T_1)/(\lambda_2 \times T_2).$$

4. A plurality of magnetoresistive heads according to claim 1, wherein said plurality of magnetoresistive heads comprise shunt biased magnetoresistive heads, and a head drive circuit connected to said magnetoresistive heads lets flow a larger bias current when a magneto-resistive head assigned to the outer region is to be driven than when a magnetoresistive head assigned to the inner region is to be driven.

5. A plurality of magnetoresistive heads according to claim 1, wherein said plurality of magnetoresistive heads comprise shunt biased magnetoresistive heads, and thickness of a shunt film connected to and disposed on one face of a magnetoresistive film included in an outer head is larger than thickness of a shunt film connected to and disposed on one face of a magnetoresistive film included in an inner head.

6. A plurality of magnetoresistive heads according to claim 1, wherein a permanent magnet film is disposed on one face of a magnetoresistive film included in said magnetoresistive head, and a permanent magnet film of an outer magnetoresistive head is thicker than a permanent magnet film of an inner magnetoresistive head.

7. In a magnetic disk unit including a plurality of read-write heads to read/write information from/onto regions obtained by dividing one face of a magnetic disk into concentric circles and including magnetoresistive heads as read heads, magnetoresistive heads for magnetic disk wherein thickness of a magnetoresistive film of a magnetoresistive head for reading information from outer tracks is made larger than thickness of a magnetoresistive film of a magnetoresistive head for reading information from inner tracks.

* * * * *